US010200477B2

United States Patent
Vasamsetti et al.

(10) Patent No.: US 10,200,477 B2
(45) Date of Patent: Feb. 5, 2019

(54) SCALABILITY AND REDUNDACY FOR MACHINE-TO-MACHINE (M2M) ARCHITECTURE

(71) Applicant: Verizon Patent and Licensing Inc., Arlington, VA (US)

(72) Inventors: Satish S. Vasamsetti, San Francisco, CA (US); Chris S. Neisinger, Danville, CA (US); Mark Guyler, Hayward, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 851 days.

(21) Appl. No.: 14/618,419

(22) Filed: Feb. 10, 2015

(65) Prior Publication Data

US 2016/0234312 A1    Aug. 11, 2016

(51) Int. Cl.
| | |
|---|---|
| *G06F 15/173* | (2006.01) |
| *H04L 29/08* | (2006.01) |
| *H04W 4/70* | (2018.01) |
| *H04L 12/24* | (2006.01) |
| *H04W 4/00* | (2018.01) |
| *H04W 4/021* | (2018.01) |

(52) U.S. Cl.
CPC ............ *H04L 67/12* (2013.01); *H04L 41/12* (2013.01); *H04L 41/30* (2013.01); *H04L 67/2814* (2013.01); *H04W 4/005* (2013.01); *H04W 4/70* (2018.02); *H04W 4/021* (2013.01)

(58) Field of Classification Search
CPC ..... H04W 4/005; H04W 88/16; H04W 12/06; H04W 48/16; H04W 84/18; H04W 60/00; H04W 76/02; H04W 24/02; H04W 24/08; H04W 4/001; H04W 4/22; H04L 67/10; H04L 67/12; H04L 41/12; H04L 63/10; H04L 43/045; H04L 63/0823; H04L 63/0876; H04L 41/0803
See application file for complete search history.

(56) References Cited

U.S. PATENT DOCUMENTS

| | | | |
|---|---|---|---|
| 2012/0016976 A1* | 1/2012 | Voellmann | G06F 17/30174 709/223 |
| 2012/0179838 A1* | 7/2012 | Tanimoto | H04L 12/4675 709/238 |
| 2013/0058209 A1* | 3/2013 | Zhu | H04W 4/005 370/221 |
| 2013/0094444 A1* | 4/2013 | Lai | H04W 8/265 370/328 |
| 2015/0109926 A1* | 4/2015 | Jin | H04W 40/04 370/235 |
| 2016/0088092 A1* | 3/2016 | Cardona-Gonzalez | H04L 67/141 709/227 |

* cited by examiner

*Primary Examiner* — Michael A Keller
*Assistant Examiner* — Thao D Duong (57) ABSTRACT

A system may comprise an aggregator gateway associated with a zone. The system may further comprise a first relay gateway and a second relay gateway connected to the aggregator. The first relay gateway and the second relay gateway may be associated with the zone. The first relay gateway may be connected to a first M2M device located in the zone and to a second M2M device located in the zone. The second relay gateway may be connected to a third M2M device located in the zone and to a fourth M2M device located in the zone.

20 Claims, 7 Drawing Sheets

SCALABILITY AND REDUNDACY FOR MACHINE-TO-MACHINE (M2M) ARCHITECTURE

BACKGROUND

Machine-to-machine (M2M) communication refers to a technology that allows devices to communicate with one another over wired or wireless networks. M2M devices may obtain data and transmit the data over the wired or wireless networks.

DETAILED DESCRIPTION OF PREFERRED EMBODIMENTS

The following detailed description of example implementations refers to the accompanying drawings. The same reference numbers in different drawings may identify the same or similar elements.

A machine-to-machine (M2M) device (e.g., a sensing device, a metering device, etc.) may obtain M2M information (e.g., sensor data, meter data, etc.). These M2M devices may provide the M2M information to an M2M gateway and the M2M gateway may provide the M2M information to a server.

The quantity of M2M devices is anticipated to increase considerably over time. However, current M2M architecture does not provide scalability to support this considerable increase in the quantity of M2M devices. Additionally, when an M2M gateway experiences a failure, M2M information, obtained by M2M devices connected to the M2M gateway, may not be transmitted (e.g., to a server). Accordingly, it may be desirable to provide scalability in an M2M architecture. Additionally, it may be desirable to provide redundancy in an M2M architecture.

Systems and/or methods described herein may provide scalability to an M2M architecture to address the anticipated increase in the quantity of M2M devices. Additionally, implementations described herein may provide redundancy for gateways in the M2M architecture.

Figure 1:
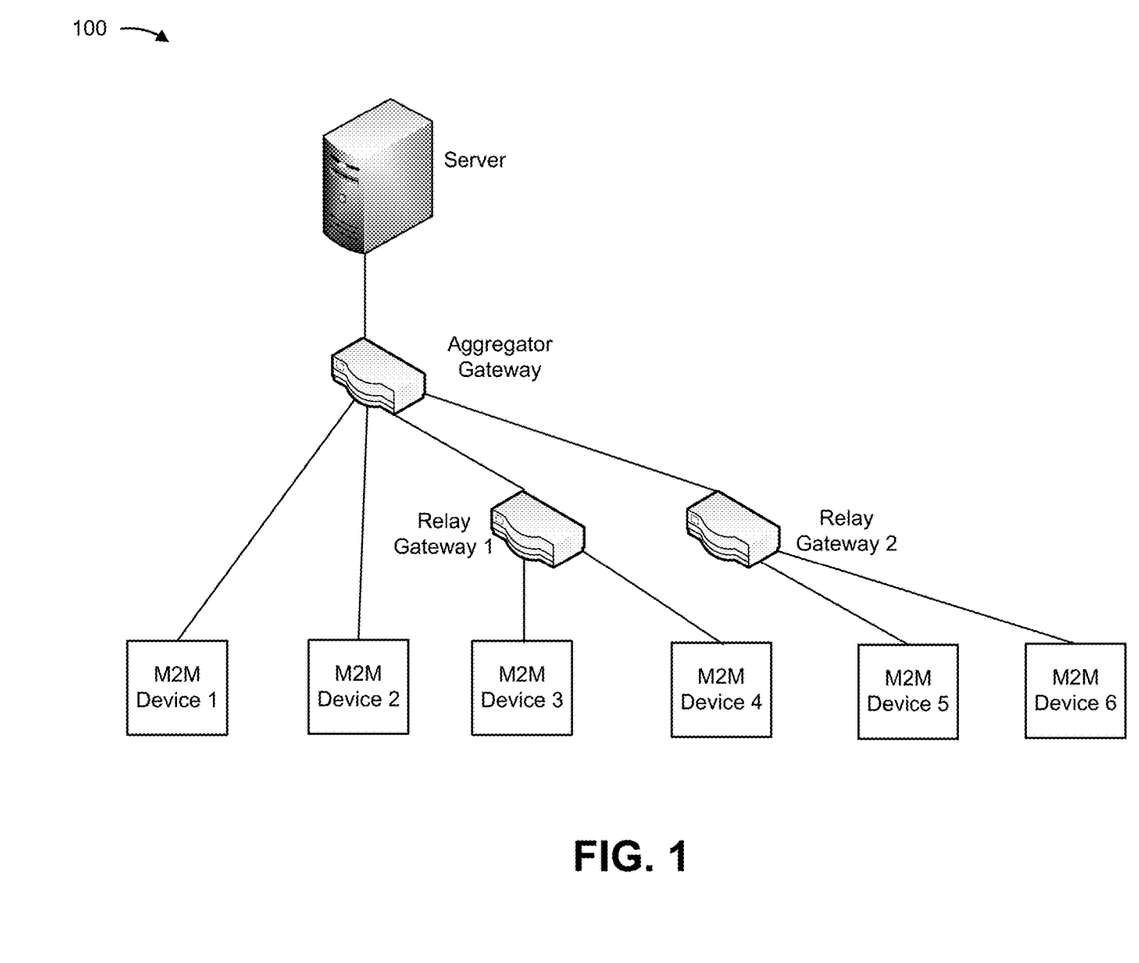
FIG. 1 is a diagram of an overview of an example implementation described herein.

FIG. 1 is a diagram of an overview of an example implementation 100 described herein. For the purposes of example implementation 100, assume that M2M devices 1 and 2 have been deployed (e.g., activated) in a zone. Further assume that an aggregator gateway has been deployed as a gateway for the zone. As used herein, a zone may refer to a location or an area. For example, a zone may refer to a home (or a portion of a home, such as a room, a floor, etc.), a building (or a portion of a building, such as a room, a floor, etc.), a geographical location, a geographical area, or the like.

As shown in FIG. 1, the aggregator gateway may be connected to M2M devices 1 and 2. Accordingly, the aggregator gateway may obtain M2M information from M2M devices 1 and 2 and transmit the M2M information to a server.

For the purposes of example implementation 100, assume that M2M devices 3 and 4 are subsequently deployed in the zone and that the aggregator gateway is unable to support M2M devices 3 and 4 (in addition to supporting M2M devices 1 and 2). Further assume that relay gateway 1 is accordingly deployed for M2M devices 3 and 4. As shown in FIG. 1, the relay gateway 1 may be connected to M2M devices 3 and 4. Accordingly, the relay gateway 1 may obtain M2M information from M2M devices 3 and 4 and transmit the M2M information to the aggregator gateway for transmission to the server.

For the purposes of example implementation 100, assume that M2M devices 5 and 6 are subsequently deployed in the zone and that the relay gateway 1 is unable to support M2M devices 5 and 6 (in addition to supporting M2M devices 3 and 4). Further assume that relay gateway 2 is accordingly deployed for M2M devices 5 and 6. As shown in FIG. 1, the relay gateway 2 may be connected to M2M devices 5 and 6. Accordingly, the relay gateway 2 may obtain M2M information from M2M devices 5 and 6 and transmit the M2M information to the aggregator gateway for transmission to the server.

In some implementations, the aggregator gateway may be connected to another aggregator gateway that is connected to another relay gateway and/or another M2M device. The aggregator gateway and the other aggregator gateway may act as backup aggregator gateways for one another. For example, when the other aggregator gateway experiences a failure, M2M information obtained by the other relay gateway and/or the other M2M device, may be transmitted to the aggregator gateway. The aggregator gateway may then transmit the M2M information to the server. Additionally, or alternatively, relay gateways may similarly act as backup relay gateways for one another.

Thus, systems and/or methods described herein may provide scalability to an M2M architecture. For example, as additional M2M devices are deployed in a zone, additional relay and/or aggregator gateways may be deployed accordingly. Additionally, implementations described herein may provide redundancy to the M2M architecture to remedy issues relating to transmission of M2M information obtained by a gateway experiencing a failure.

Figure 2:
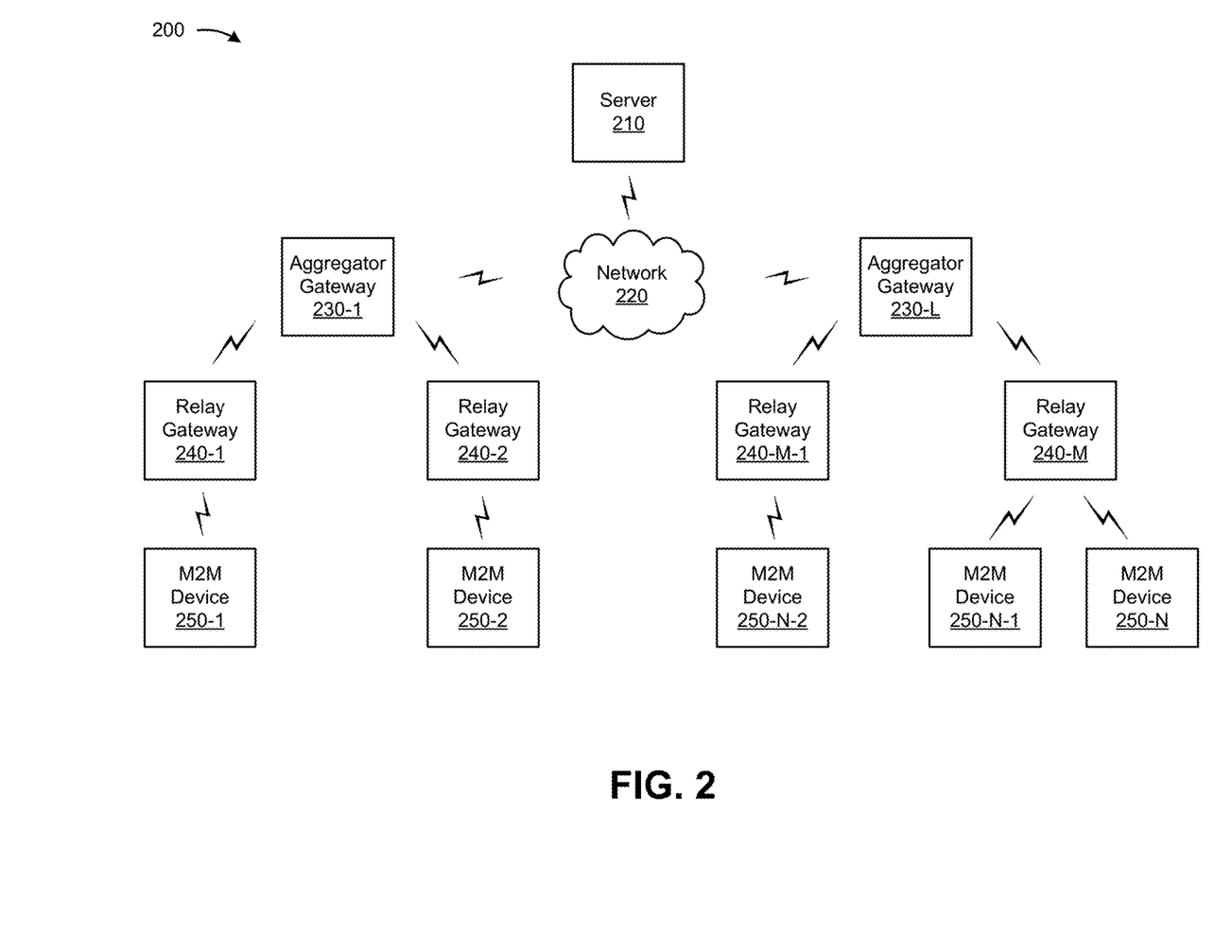
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a server 210, a network 220, one or more aggregator gateways 230-1 through 230-L (L≥1) (hereinafter referred to collectively as "aggregator gateways 230," and individually as "aggregator gateway 230"), one or more relay gateways 240-1 through 240-M (M≥1) (hereinafter referred to collectively as "relay gateways 240," and individually as "relay gateway 240"), and one or more M2M devices 250-1 through 250-N (N≥1) (hereinafter referred to collectively as "M2M devices 250," and individually as "M2M device 250"). Devices of environment 200 may interconnect via wired connections, wireless connections, or a combination of wired and wireless connections.

Server 210 may include one or more devices capable of storing, processing, and/or routing information. Server 210 may include a server device or a collection of server devices capable of processing M2M information obtained by M2M devices 250 and capable of transmitting information to aggregator gateways 230, relay gateways 240, and/or M2M devices 250. In some implementations, server 210 may include a communication interface that allows server 210 to receive information from and/or transmit information to other devices in environment 200. In some implementations, server 210 may transmit, to a gateway, information that may enable the gateway to operate in aggregator mode or in relay mode, as will be described in more details below. In some implementations, the information may include information identifying a zone with which the gateway is associated, information indicating whether the gateway is to operate (e.g., in the zone) in aggregator mode or in relay mode, information identifying M2M devices 250 associated with the zone (e.g., including M2M devices 250 with which a connection is to be established, information identifying M2M devices 250 connected to other gateways, etc.), or the like.

In some implementations, server 210 may provide information regarding the zone (e.g., information identifying the zone, information identifying devices associated with the zone, M2M information obtained by the devices, or the like).

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Aggregator gateway 230 may include a device capable of providing connectivity for M2M devices 250 to server 210. For example, aggregator gateway 230 may include one or more data processing and/or traffic transfer devices, such as a gateway, a router (e.g., an edge router, an access router, etc.), a modem, a switch, a firewall, a network interface card ("NIC"), a hub, a bridge, a server, an optical add/drop multiplexer ("OADM"), or any other type of device that processes and/or transfers traffic. In some implementations, aggregator gateway 230 may include a device capable of obtaining M2M information from M2M devices 250 and/or from M2M gateways (aggregator or relay) and capable of transmitting the M2M information to server 210. In some implementations, aggregator gateway 230 may receive information from server 210 and may transmit the information to M2M devices 250 and/or other gateways. Aggregator gateway 230 may include an M2M gateway that operates in aggregator mode.

Relay gateway 240 may include a device similar to aggregator gateway 230. In some implementations, relay gateway 240 may include a device capable of obtaining M2M information from M2M devices 250 and/or from other relay gateways 240 and capable of transmitting the M2M information to an aggregator gateway 230. In some implementations, relay gateway 240 may transmit, to an aggregator gateway 230, information identifying M2M devices 250 from which M2M information is obtained. Relay gateway 240 may include an M2M gateway that operates in relay mode.

M2M device 250 may include a device capable of receiving, processing, and/or providing information (e.g., M2M information). For example, M2M device 250 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), an appliance (e.g., a refrigerator, a microwave, a stove, etc.), a medical device, a car, a light bulb, a sensing device/sensor, a processing device, an actuating device/actuator, a metering device, a camera device, a smart plug, a motion detecting device, and/or any other smart device. For example, M2M device 250 may include a device capable of monitoring and/or sensing M2M information in real-time. For example, M2M device 250 may obtain data relating to temperature, obtain data relating to humidity, obtain data relating to a level of carbon monoxide, obtain data relating to motion, obtain data relating to a sound, or the like. In other words, M2M device 250 may be any "thing" in the Internet of Things (IoT). In some implementations, M2M device 250 may include a communication interface that allows M2M device 250 to receive information from and/or transmit information to another device in environment 200. For example, M2M device 250 may transmit information to aggregator gateways 230 and/or relay gateways 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
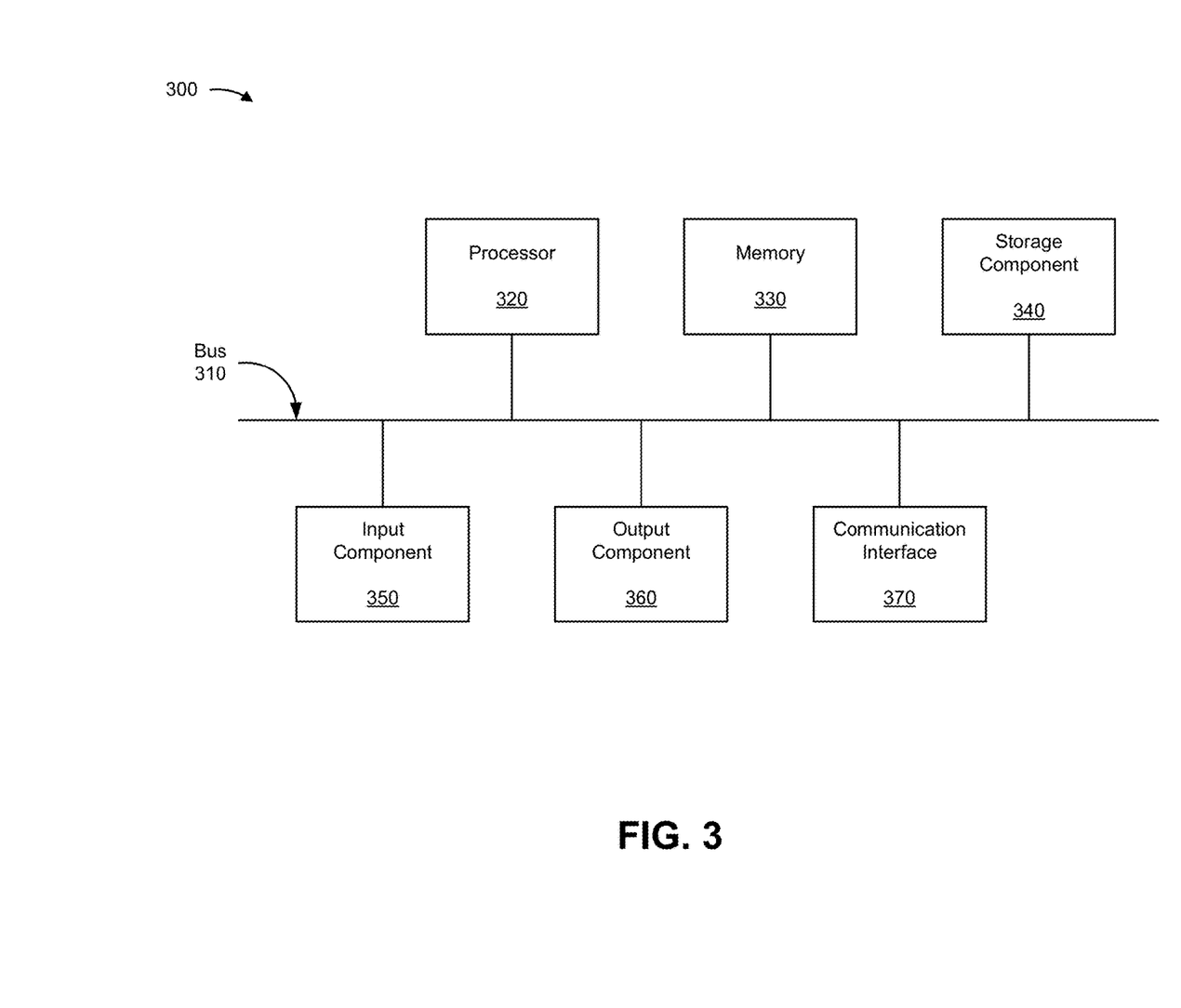
FIG. 3 is a diagram of example components of one or more devices of FIG. 2.

FIG. 3 is a diagram of example components of a device 300. Device 300 may correspond to server 210, aggregator gateway 230, relay gateway 240, and/or M2M device 250. In some implementations, server 210, aggregator gateway 230, relay gateway 240, and/or M2M device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
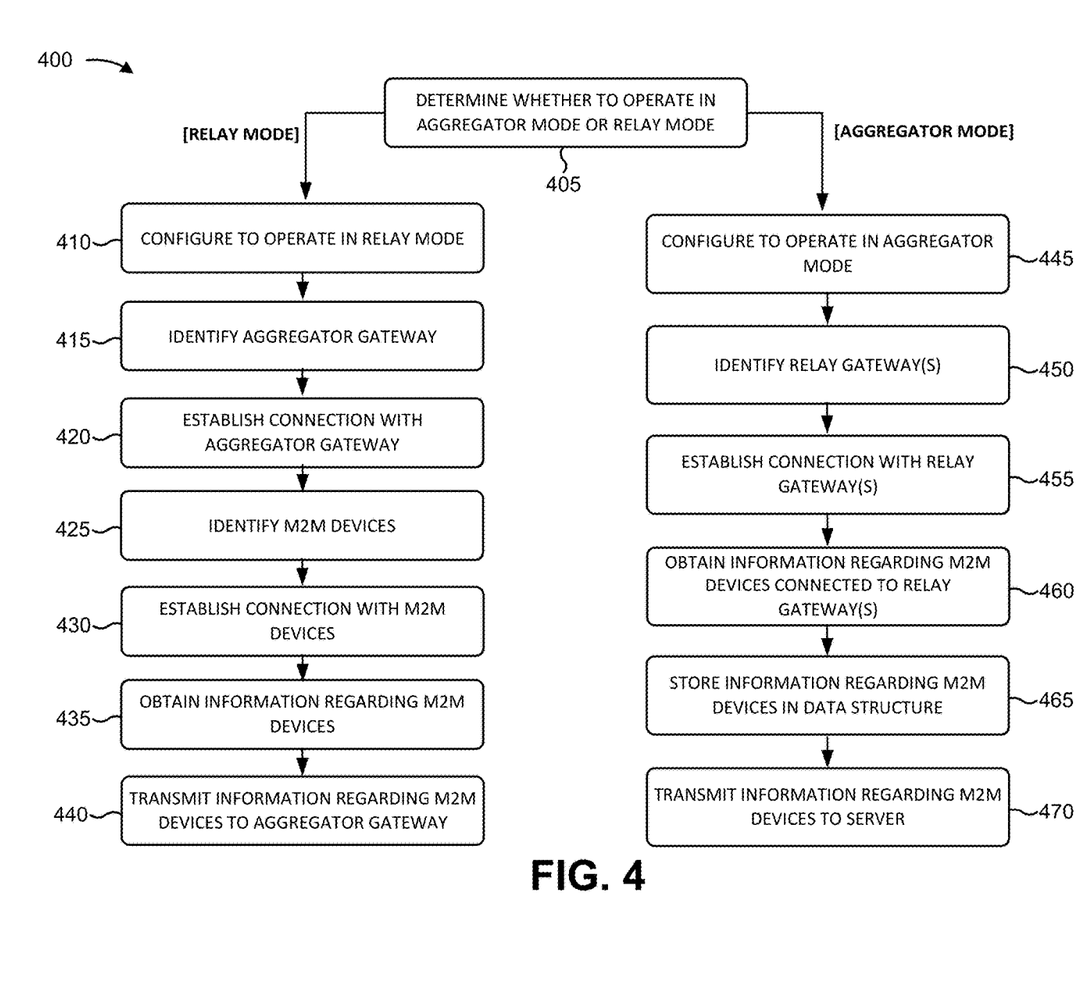
FIG. 4 is a flow chart of an example process for configuring a gateway to operate in aggregator mode or in relay mode.

FIG. 4 is a flow chart of an example process 400 for configuring a gateway to operation aggregator mode or in relay mode. In some implementations, one or more process blocks of FIG. 4 may be performed by a gateway (e.g., aggregator gateway 230 or relay gateway 240). In some implementations, one or more process blocks of FIG. 4 may be performed by another device or a set of devices separate from or including aggregator gateway 230 and/or relay gateway 240, such as server 210.

As shown in FIG. 4, process 400 may include determining whether to operate in aggregator mode or relay mode. (block 405). For example, the gateway may determine whether to operate in aggregator mode or in relay mode upon powering on, booting up, or the like. In some implementations, the gateway may determine whether to operate in aggregator mode or in relay mode based on mode information. In some implementations, the gateway may be pre-loaded with the mode information. In some implementations, the gateway may transmit a request to server 210 for the mode information and may receive the mode information from server 210 based on transmitting the request.

In some implementations, the mode information may include information indicating that the gateway is to operate in aggregator mode or in relay mode, information identifying a zone with which gateway is associated, and/or information indicating whether an aggregator gateway 230 is associated with the zone. Accordingly, the gateway may determine to operate in aggregator mode when the mode information indicates that no aggregator gateway 230 is associated with the zone and/or when the mode information indicates that gateway is to operate in aggregator mode. Alternatively, the gateway may determine to operate in relay mode when the mode information indicates that an aggregator gateway 230 is associated with the zone and/or when the mode information indicates that the gateway is to operate in relay mode.

In some implementations, the gateway may be deployed to address an increase in M2M devices 250 deployed in the zone. In some implementations, the gateway may be located in the zone or located remotely from the zone. In some implementations, the gateway may be associated with multiple, different zones.

As further shown in FIG. 4, when it is determined to operate in relay mode (Block 405—RELAY MODE), process 400 may include configuring to operate in relay mode (block 410). For example, after determining to operate in relay mode, the gateway may be configured to operate in relay mode based on relay configuration information. The relay configuration information may include information used to configure gateways in relay mode to perform the functions, described in more details below, of a relay gateway 240.

In some implementations, the gateway may be pre-loaded with the relay configuration information. In some implementations, the gateway may transmit a request to server 210 for the relay configuration information and may receive the relay configuration information from server 210 based on transmitting the request.

In some implementations, the relay configuration information may include information identifying devices associated with the zone, such as information identifying a primary aggregator gateway (e.g., an aggregator gateway 230), information identifying a secondary aggregator gateway (e.g., another aggregator gateway 230), information identifying M2M devices (e.g., M2M devices 250), or the like. In some implementations, the information identifying the devices associated with the zone may include a network address of each of the devices, such as an Internet Protocol address, a media access control (MAC) address, or the like.

Additionally, or alternatively, the relay configuration information may include connection information for establishing a connection with the devices associated with the zone, information regarding obtaining and transmitting M2M information, and/or any other information that may enable the gateway to perform the functions of a relay gateway 240. In some implementations, the connection information may include information identifying a type of connection to establish with each of the devices associated with the zone. In some implementations, the information regarding obtaining and transmitting M2M information may include information identifying a frequency/particular schedule for obtaining M2M information from M2M devices and/or for transmitting the M2M information (e.g., to the primary aggregator gateway and/or to the secondary aggregator gateway).

In some implementations, the relay configuration information may be modified by a user (e.g., an administrator) associated with the gateway or server 210.

As further shown in FIG. 4, process 400 may include identifying an aggregator gateway (block 415). For example, after being configured to operate in relay mode, the gateway may identify the primary aggregator gateway (e.g., aggregator gateway 230) based on the information identifying devices associated with the zone. In some implementations, the gateway may initiate a discovery process to identify the primary aggregator gateway. For example, the gateway may generate a message and transmit the message to a network address of the primary aggregator gateway (e.g., included in the information identifying the devices). The gateway may receive a response to the message from the primary aggregator gateway and identify the primary aggregator gateway based on the response. Additionally, or alternatively, the gateway may generate and broadcast a message. The primary aggregator gateway may receive the message and transmit a response to the gateway. The gateway may receive the response to the message from the primary aggregator gateway and identify the primary aggregator gateway based on the response.

In some implementations, the gateway may authenticate the primary aggregator gateway (or vice versa). For example, the gateway may transmit a request, to the primary aggregator gateway, for authentication information, receive the authentication information from the primary aggregator gateway, and may authenticate the primary aggregator gateway based on the authentication information. For example, the gateway may compare the authentication information to information identifying the aggregator gateway (e.g., included in the information identifying devices associated with the zone). In some implementations, the authentication information may include a code. In some implementations, the gateway and the primary aggregator gateway may exchange a key with each other to authenticate each other.

Additionally, or alternatively, the gateway may similarly identify a secondary aggregator gateway, based on the information identifying devices associated with the zone, and authenticate the secondary aggregator gateway in a manner similar to that described above with respect to authenticating the primary aggregator gateway. The secondary aggregator gateway may act as a backup to the primary aggregator gateway and may take over operations of the primary aggregator gateway in case of failure of the primary aggregator gateway.

In some implementations, the gateway may transmit M2M information (obtained from the M2M devices (e.g., M2M devices 250)) to the primary aggregator gateway for transmission to server 210 when the primary aggregator gateway is not experiencing a failure and may transmit the M2M information to the secondary aggregator gateway for transmission to server 210 when the primary aggregator gateway is experiencing a failure.

As further shown in FIG. 4, process 400 may include establishing a connection with the aggregator gateway (block 420). For example, after identifying the primary aggregator gateway, the gateway may establish a connection with the primary aggregator gateway based on the connection information. In some implementations, the gateway may establish a wireless connection with the primary aggregator gateway based on the connection information. The wireless connection may include Wi-Fi connection, a Zigbee connection, a Bluetooth connection, a Zwave connection, or the like. Additionally, or alternatively, the gateway may establish a wired connection with the primary aggregator gateway based on the connection information. The wired connection may include an Ethernet connection, a Token Ring connection, an ARCnet (Attached Resource Computer NETwork) connection, or the like.

As further shown in FIG. 4, process 400 may include identifying M2M devices (block 425). For example, after being configured to operate in relay mode, the gateway may identify the M2M devices (e.g., M2M devices 250) in a manner similar to that described above with respect to identifying the primary aggregator gateway. In some implementations, the gateway may authenticate the M2M devices (or vice versa) in a manner similar to that described above with respect to authenticating the primary aggregator gateway.

As further shown in FIG. 4, process 400 may include establishing a connection with the M2M devices (block 430). For example, after identifying the M2M devices, the gateway may establish a connection with the M2M devices based on the connection information. In some implementations, the gateway may establish a wireless connection with the M2M devices based on the connection information. The wireless connection may include Wi-Fi connection, a Zigbee connection, a Bluetooth connection, a Zwave connection, or the like. Additionally, or alternatively, the gateway may establish a wired connection with the M2M devices based on the connection information. The wired connection may include an Ethernet connection, a Token Ring connection, an ARCnet (Attached Resource Computer NETwork) connection, or the like.

As further shown in FIG. 4, process 400 may include obtaining information regarding M2M devices (block 435). For example, after establishing the connection with the M2M devices, the gateway may obtain, from the M2M devices, information regarding the M2M devices via the connection established with the M2M devices. In some implementations, the gateway may obtain, from the M2M devices, the information regarding the M2M devices using a communications protocol, such as Wi-Fi, Zigbee, Bluetooth, Zwave, or the like.

In some implementations, the information regarding the M2M devices may include information identifying the M2M devices (e.g., a network address of the M2M devices, a type of the M2M devices, a location of the M2M devices, etc.), information identifying a location of the M2M devices, information indicating whether the M2M devices are operational, or the like. Additionally, or alternatively, the information regarding the M2M devices may include M2M information obtained by the M2M devices (e.g., data measured, sensed, or otherwise obtained by the M2M devices).

In some implementations, the gateway may periodically transmit a request for the information regarding the M2M devices to the M2M devices and may periodically receive the information regarding the M2M devices based on transmitting the request. Additionally, or alternatively, the gateway may periodically receive the information regarding the M2M devices from the M2M devices without requesting the information regarding the M2M devices. For example, the gateway may periodically obtain the information regarding the M2M devices based on the frequency/particular schedule for obtaining and transmitting M2M information (included in the relay configuration information).

As further shown in FIG. 4, process 400 may include transmitting the information regarding M2M devices to aggregator gateway (block 440). For example, after obtaining the information regarding the M2M devices from the M2M devices, the gateway may transmit the M2M information to the primary aggregator gateway via the connection established with the primary aggregator gateway. In some implementations, the gateway may transmit the information regarding the M2M devices using a communications protocol, such as Wi-Fi, Zigbee, Bluetooth, Zwave, or the like.

In some implementations, the gateway may periodically receive a request for the information regarding the M2M devices from the primary aggregator gateway and may transmit the information regarding the M2M devices based on receiving the request. In some implementations, the gateway may periodically transmit the information regarding the M2M devices to the primary aggregator gateway without receiving a request from the primary aggregator gateway. For example, the gateway may periodically transmit, to the primary aggregator gateway, the information regarding the M2M devices based on the frequency/particular schedule for obtaining and transmitting M2M information (included in the relay configuration information). In some implementations, the primary aggregator gateway may provide the information regarding the M2M devices to server 210. In some implementations, the gateway may aggregate information from multiple M2M devices and/or relay gateways and send the information to the primary aggregator gateway thereafter.

In some implementations, when the primary aggregator gateway is experiencing a failure, the gateway may establish a connection with the secondary aggregator gateway (in a manner similar to that described above with respect to block 420) and transmit the information regarding the M2M devices to the secondary aggregator gateway. In some implementations, the gateway may periodically receive information indicating that the primary aggregator gateway is operational and determine that the primary aggregator gateway is experiencing a failure when the information indicating that the primary aggregator gateway is operational is not received within a threshold period of time. Additionally, or alternatively, the gateway may determine that the primary aggregator gateway is experiencing a failure when a particular quantity of transmissions of the information indicating that the primary aggregator gateway is operational is not received. For example, the gateway may determine that the primary aggregator gateway is experiencing a failure when three transmissions of the information, indicating that the primary aggregator gateway is operational, are not received in a row. Additionally, or alternatively, the gateway may transmit an inquiry to the primary aggregator gateway regarding whether the primary aggregator gateway is operational and determine that the primary aggregator gateway is experiencing a failure when no response to the inquiry is received from the primary aggregator gateway within a period of time after transmitting the inquiry. Additionally, or alternatively, the gateway may receive information, from the secondary aggregator gateway, indicating that the primary aggregator gateway is experiencing a failure.

As further shown in FIG. 4, when it is determined to operate in aggregator mode (Block 405—AGGREGATOR MODE), process 400 may include configuring to operate in aggregator mode (block 445). For example, after determining to operate in aggregator mode, the gateway may be configured to operate in aggregator mode based on aggregator configuration information. The aggregator configuration information may include information used to configure gateways in aggregator mode to perform the functions, described in more details below, of an aggregator gateway 230.

In some implementations, the gateway may be pre-loaded with the aggregator configuration information. In some implementations, the gateway may transmit a request to server 210 for the aggregator configuration information and may receive the aggregator configuration information from server 210 based on transmitting the request.

In some implementations, the aggregator configuration information may include information identifying devices associated with the zone, such as information identifying another aggregator gateway (e.g., another aggregator gateway 230), information identifying relay gateways (e.g., relay gateways 240), information identifying M2M devices (e.g., M2M devices 250), or the like. In some implementations, the information identifying the devices associated with the zone may include a network address of each of the devices, such as an Internet Protocol address, a media access control (MAC) address, or the like.

Additionally, or alternatively, the aggregator configuration information may include connection information for establishing a connection with the devices associated with the zone, information regarding obtaining and transmitting M2M information, and/or any other information that may enable the gateway to perform the functions of an aggregator gateway 230. In some implementations, the connection information may include information identifying a type of connection to establish with each of the devices associated with the zone. In some implementations, the information regarding obtaining and transmitting M2M information may include information identifying a frequency/particular schedule for obtaining M2M information from M2M devices and/or from relay gateways and/or for transmitting the M2M information (e.g., to server 210 and/or another aggregator gateway).

In some implementations, the aggregator configuration information may be modified by a user (e.g., an administrator) associated with the gateway or server 210.

As further shown in FIG. 4, process 400 may include identifying relay gateways (block 450). For example, after being configured to operate in aggregator mode, the gateway may identify and authenticate the relay gateways in a manner similar to that described above with respect to block 415. Additionally, or alternatively, the gateway may similarly identify and authenticate the M2M devices in a manner similar to that described above with respect to block 425.

As further shown in FIG. 4, process 400 may include establishing a connection with the relay gateway(s) (block 455). For example, after identifying and authenticating the relay gateways, the gateway may establish a connection with the relay gateways in a manner similar to that described above with respect to block 420. Additionally, or alternatively, the gateway may establish a connection with the M2M devices in a manner similar to that described above with respect to block 430.

As further shown in FIG. 4, process 400 may include obtaining information regarding M2M devices connected to relay gateway(s) (block 460). For example, after establishing the connection with the relay gateways, the gateway may obtain, from the relay gateways, information regarding particular M2M devices associated with the relay gateways (e.g., identified by and/or connected to the relay gateways) via the connection established with the relay gateways. Additionally, or alternatively, after establishing the connection with the M2M devices, the gateway may obtain, from the M2M devices, information regarding the M2M devices via the connection established with the M2M devices.

In some implementations, the gateway may obtain the information regarding the particular M2M devices and/or the information regarding the M2M devices in a manner similar to that described above with respect to block 435. In some implementations, the information regarding the particular M2M devices and/or the information regarding the M2M devices may include information similar to that described above with respect to block 435.

As further shown in FIG. 4, process 400 may include storing information regarding M2M devices in a data structure (block 465). For example, after obtaining the information regarding the particular M2M devices, the gateway may store the information regarding the particular M2M devices in a data structure. The data structure may be stored in a memory associated with the gateway (e.g., a memory internal and/or external to the gateway). In some implementations, the gateway may create the data structure using the information regarding the particular M2M devices. For example, the gateway may create the data structure when the information regarding the particular M2M devices has not been stored in the memory associated with the gateway. Additionally, or alternatively, the gateway may update the data structure using the information regarding the particular M2M devices. For example, the gateway may update previous information regarding the particular M2M devices stored in the data structure.

In some implementations, the data structure may include information identifying the particular M2M devices, M2M information obtained by the particular M2M devices, information identifying the relay gateways, information identifying associations between the particular M2M devices and the relay gateways (e.g., which M2M device is connected to a relay gateway), timestamps associated with the particular M2M devices obtaining the M2M information, timestamps associated with the relay gateways providing the information regarding the particular M2M devices, timestamps associated with the gateway providing the information regarding the particular M2M devices, or the like.

Additionally, or alternatively, the gateway may similarly store the information regarding the M2M devices in the data structure.

As further shown in FIG. 4, process 400 may include transmitting the information regarding M2M devices to a server (block 470). For example, after obtaining the information regarding the particular M2M devices, the gateway may transmit the information regarding the particular M2M devices to server 210. In some implementations, the gateway may transmit the information regarding the particular M2M devices to server 210 based on a request from server 210 for the information regarding the particular M2M devices. In some implementations, the gateway may periodically transmit the information regarding the particular M2M devices to server 210 without a request from server 210. Additionally, or alternatively, after obtaining the information regarding the M2M devices, the gateway may similarly transmit the information regarding the M2M devices to server 210. In some implementations, the gateway may aggregate information from multiple M2M devices and/or relay gateways and send the information to server 210.

The server may use the information regarding the particular M2M devices and/or the information regarding the M2M devices to provide, to a user (e.g., associated with server 210, the particular M2M devices, and/or the M2M devices), information regarding the zone. In some implementations, the information regarding the zone may include information regarding the particular M2M devices and/or the M2M devices (e.g., statistical and/or performance), information regarding the relay gateways (e.g., statistical and/or performance), information regarding the gateway (e.g., statistical and/or performance), or the like.

In some implementations, a gateway (operating in aggregator mode or in relay mode) may receive information, transmitted by server 210, and may transmit the information to M2M devices associated with the gateway. In some implementations, the information may relate to an operation of the M2M devices. For example, the information may cause the M2M devices to power up or power down, periodically output M2M information (e.g., according to a particular schedule), output a particular type of M2M information, or the like.

In some implementations, a gateway (operating in aggregator mode or in relay mode) may be associated with different zones. For example, a gateway may be associated with and establish connections with first M2M devices in a first zone, and may be associated with and establish connections with second M2M devices in a second zone.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
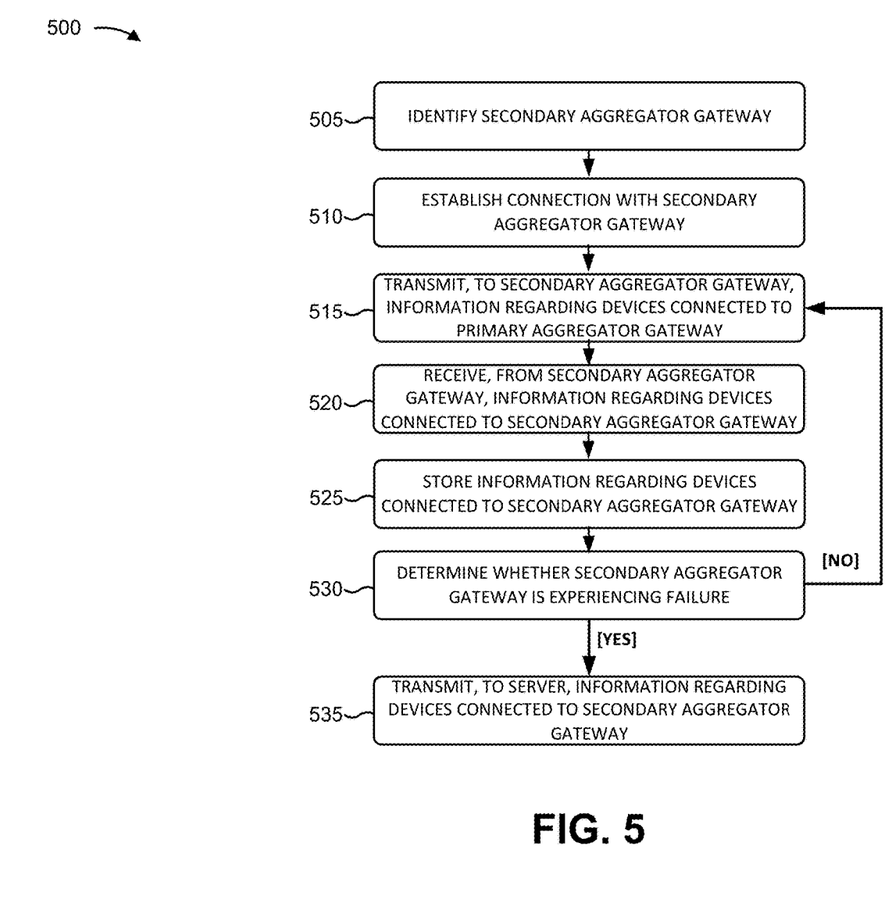
FIG. 5 is a flow chart of an example process for providing redundancy in an M2M architecture.

FIG. 5 is a flow chart of an example process 500 for providing redundancy in an M2M architecture. In some implementations, one or more process blocks of FIG. 5 may be performed by an aggregator gateway 230. In some implementations, one or more process blocks of FIG. 6 may be performed by another device or a set of devices separate from or including an aggregator gateway 230, such as another aggregator gateway 230, a relay gateway 240, server 210, or the like.

As shown in FIG. 5, process 500 may include identifying a secondary aggregator gateway (block 505). For example, aggregator gateway 230 (e.g., primary aggregator gateway 230) may identify secondary aggregator gateway 230 based on information identifying devices associated with a zone with which primary aggregator gateway 230 is associated, in a manner similar to that described above with respect to block 415. Primary aggregator gateway 230 and secondary aggregator gateway 230 may operate as backups for each other, as will be described in more detail below. In some implementations, primary aggregator gateway 230 and secondary aggregator gateway 230 may be associated with a same zone or with different zones.

As further shown in FIG. 5, process 500 may include establishing a connection with the secondary aggregator gateway (block 510). For example, after identifying secondary aggregator gateway 230, primary aggregator gateway 230 may establish a connection with secondary aggregator gateway 230 in a manner similar to that described above with respect to block 420.

As further shown in FIG. 5, process 500 may include transmitting, to the secondary aggregator gateway, information regarding devices connected to the primary aggregator gateway (block 515). For example, after establishing the connection with secondary aggregator gateway 230, primary aggregator gateway 230 may transmit to secondary aggregator gateway 230, via the connection, information regarding devices connected to primary aggregator gateway 230. The devices may include relay gateways 240 and/or M2M devices (e.g., M2M devices 250).

In some implementations, primary aggregator gateway 230 may obtain the information regarding the devices connected to primary aggregator gateway 230 from a data structure. The data structure may be stored in a memory associated with primary aggregator gateway 230 (e.g., a memory internal to and/or external to primary aggregator gateway 230). In some implementations, the information regarding the devices connected to primary aggregator gateway 230 may be similar to the type of information stored in the data structure discussed above with respect to block 465.

In some implementations, primary aggregator gateway 230 may periodically transmit the information regarding the devices to secondary aggregator gateway 230. The period of time, for transmitting the information regarding the devices to secondary aggregator gateway 230, may be configurable by a user associated with server 210, primary aggregator gateway 230, the devices connected to primary aggregator gateway 230, or the like. Additionally, or alternatively, primary aggregator gateway 230 may receive a request for the information regarding the devices from secondary aggregator gateway 230 and may transmit the information regarding the devices to secondary aggregator gateway 230 based on the request.

As further shown in FIG. 5, process 500 may include receiving, from the secondary aggregator gateway, information regarding devices connected to the secondary aggregator gateway (block 520). For example, after establishing the connection with secondary aggregator gateway 230, primary aggregator gateway 230 may receive, from secondary aggregator gateway 230 and via the connection, information regarding devices connected to secondary aggregator gateway 230. The devices may include other relay gateways 240 and/or other M2M devices 250. In some implementations, the information regarding the devices connected to secondary aggregator gateway 230 may be similar to the type of information stored in the data structure discussed above with respect to block 465. In some implementations, primary aggregator gateway 230 may periodically receive the information regarding the devices connected to secondary aggregator gateway 230 in a manner similar to that described above with respect to block 515. Additionally, or alternatively, primary aggregator gateway 230 may transmit, to secondary aggregator gateway 230, a request for the information regarding the devices connected to secondary aggregator gateway 230 and receive the information regarding the devices connected to secondary aggregator gateway 230 based on the request. In some implementations, after transmitting the request for the information regarding the devices connected to secondary aggregator gateway 230 and receiving the information regarding the devices connected to secondary aggregator gateway 230, primary aggregator gateway 230 may periodically receive updates to the information regarding the devices connected to secondary aggregator gateway 230. In some implementations, primary aggregator gateway 230 may receive the information regarding the devices connected to secondary aggregator gateway 230 from another device, such as server 210.

As further shown in FIG. 5, process 500 may include storing information regarding devices connected to the secondary aggregator gateway (block 525). For example, after receiving the information regarding the devices connected to secondary aggregator gateway 230, primary aggregator gateway 230 may store the information regarding the devices connected to secondary aggregator gateway 230 in the data structure, in a manner similar to that described above with respect to block 465. In some implementations, primary aggregator gateway 230 may periodically update the data structure based on periodically receiving the information regarding the devices connected to secondary aggregator gateway 230.

As further shown in FIG. 5, process 500 may include determining whether the secondary aggregator gateway is experiencing a failure (block 530). For example, after establishing the connection with secondary aggregator gateway 230, primary aggregator gateway 230 may determine whether secondary aggregator gateway 230 is experiencing a failure.

In some implementations, primary aggregator gateway 230 may periodically receive information indicating whether secondary aggregator gateway 230 is operational and determine whether secondary aggregator gateway 230 is experiencing a failure based on the information. For example, primary aggregator gateway 230 may determine that secondary aggregator gateway 230 is operational when the information indicates that secondary aggregator gateway 230 is operational. Alternatively, primary aggregator gateway 230 may determine that secondary aggregator gateway 230 is experiencing a failure when the information indicates that secondary aggregator gateway 230 is not operational and/or when the information is not received within a threshold period of time and/or when a quantity of transmissions of the information is not received (e.g., in a manner similar to that described above with respect to block 440). Additionally, or alternatively, primary aggregator gateway 230 may transmit an inquiry to secondary aggregator gateway 230 regarding whether secondary aggregator gateway 230 is operational and determine that secondary aggregator gateway 230 is experiencing a failure when no response to the inquiry is received from secondary aggregator gateway 230 within a threshold period of time after transmitting the inquiry and/or when a quantity of responses is not received (e.g., in a manner similar to that described above with respect to block 440). Alternatively, primary aggregator gateway 230 may determine that secondary aggregator gateway 230 is operational when a response, to the inquiry, indicates that secondary aggregator gateway 230 is operational.

Additionally, or alternatively, primary aggregator gateway 230 may receive information, from server 210, indicating whether secondary aggregator gateway 230 is operational. The information may be periodically received from server 210 and/or may be received based on primary aggregator gateway 230 transmitting a request to server 210.

As further shown in FIG. 5, if the secondary aggregator gateway is experiencing a failure (block 530—YES), process 500 may include transmitting, to a server, information regarding devices connected to the secondary aggregator gateway (block 535). For example, after determining that secondary aggregator gateway 230 is experiencing a failure, primary aggregator gateway 230 may transmit the information regarding the devices connected to secondary aggregator gateway 230 to server 210. In some implementations, primary aggregator gateway 230 may obtain the information regarding the devices connected to secondary aggregator gateway 230 from the data structure and transmit the information regarding the devices connected to secondary aggregator gateway 230 to server 210.

Additionally, or alternatively, primary aggregator gateway 230 may establish a connection with the devices connected to secondary aggregator gateway 230 and obtain the information regarding the devices connected to secondary aggregator gateway 230 from the devices. Primary aggregator gateway 230 may then transmit the information regarding the devices connected to secondary aggregator gateway 230 to server 210. In some implementations, primary aggregator gateway 230 may transmit, to the devices and based on information identifying the devices (e.g., stored in the data structure), a request to establish the connections with the devices and establish the connection based on transmitting the request. Additionally, or alternatively, primary aggregator gateway 230 may receive a request, from the devices, to establish the connection with the devices and establish the connection based on receiving the request. In some implementations, primary aggregator gateway 230 may determine whether a difference between a current date and/or time and a timestamp, associated the information regarding the devices connected to secondary aggregator gateway 230 stored in the data structure, exceeds a threshold. Primary aggregator gateway 230 may obtain the information regarding the devices connected to secondary aggregator gateway 230 from the devices when the difference exceeds the threshold. In some implementations, the obtained information regarding the devices may be an updated version of the stored information regarding the devices.

As further shown in FIG. 5, if the secondary aggregator gateway is not experiencing a failure (block 530—NO), process 500 may include returning to block 515 or block 520. For example, after determining that secondary aggregator gateway 230 is not experiencing a failure, primary aggregator gateway 230 may continue to transmit the information regarding the devices connected to primary aggregator gateway 230 and/or receive the information regarding the devices connected to secondary aggregator gateway 230.

Although process 500 has been described with respect to aggregator gateways 230, process 500 may be applicable to relay gateways 240 in some implementations.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
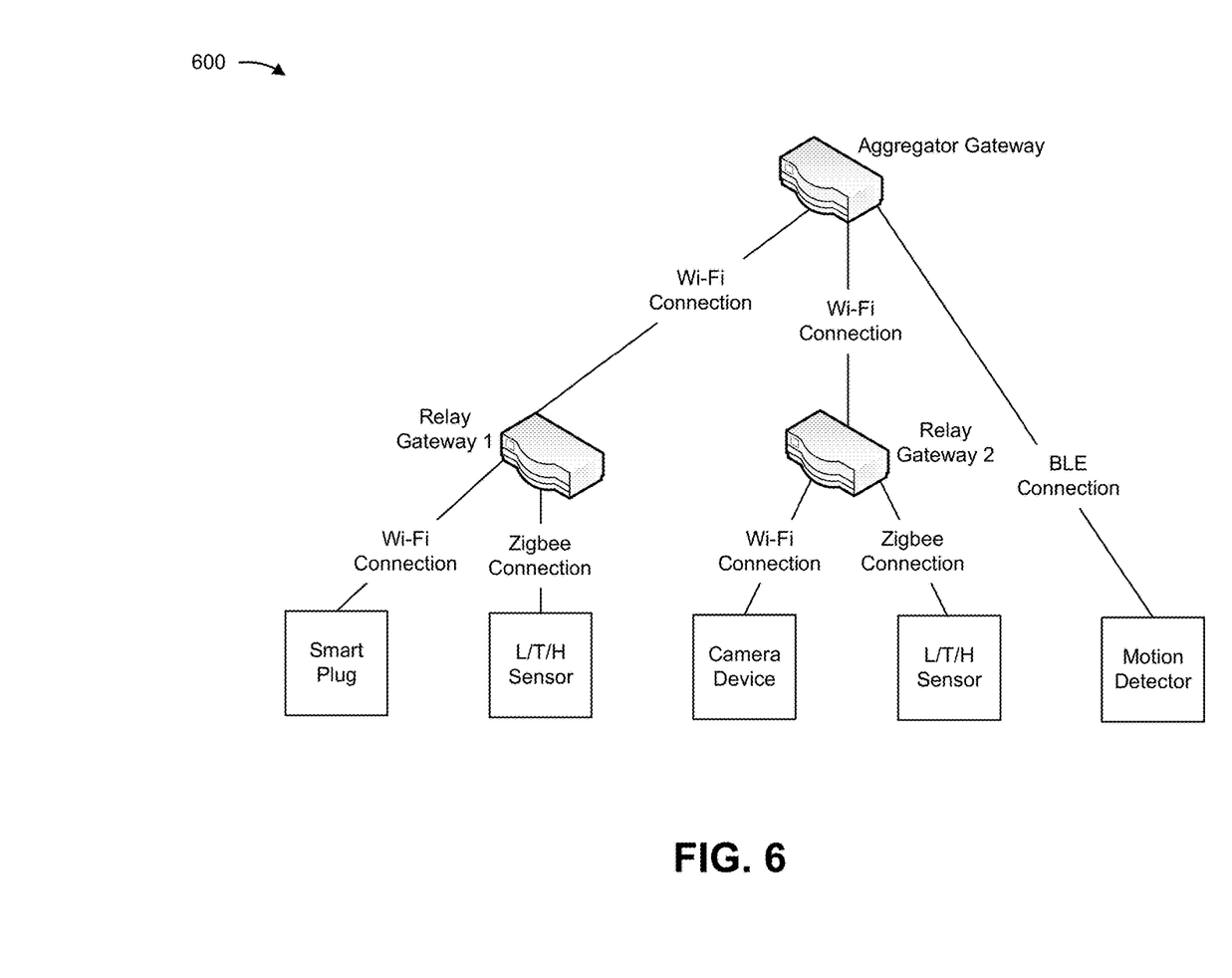
FIG. 6 is a diagram of an example implementation relating to the example process shown in FIG. 4.

FIG. 6 is a diagram of an example implementation 600 relating to example process 400 shown in FIG. 4. For the purposes of example implementation 600, assume that an aggregator gateway (e.g., aggregator gateway 230) is associated with a particular zone (e.g., a particular floor of a building) and that upon powering on, the aggregator gateway determines and configures itself to operate in aggregator mode for the particular zone. Further assume that a motion detector has been deployed in the zone and that the aggregator gateway identifies the motion detector as an M2M device (e.g., M2M device 250) associated with the zone. As shown in FIG. 6, assume that the aggregator gateway establishes a BLE connection with the motion detector. The aggregator gateway may obtain first M2M information (e.g., motion information) from the motion detector and transmit the first M2M information to a server. For the purposes of example implementation 600, further assume that a smart plug and a light/temperature/heat (L/T/H) sensor are subsequently deployed in the zone.

Further assume that a relay gateway 1 (e.g., relay gateway 240) is deployed because the aggregator gateway cannot support the motion detector, the smart plug, and the L/T/H sensor. Further assume that, upon powering on, relay gateway 1 determines and configures itself to operate in relay mode and that relay gateway 1 identifies the smart plug and the L/T/H sensor as M2M devices (e.g., M2M devices 250) associated with the zone. As shown in FIG. 6, assume that relay gateway 1 establishes a Wi-Fi connection with the smart plug and establishes a Zigbee connection with the L/T/H sensor. Relay gateway 1 may obtain second M2M information from the smart plug and the L/T/H sensor and transmit the second M2M information to the aggregator gateway for transmission to the server.

For the purposes of example implementation 600, further assume a camera device and another L/T/H sensor are subsequently deployed in the zone. Further assume that relay gateway 2 is deployed because relay gateway 1 cannot support the smart plug, the L/T/H sensor, the camera device, and the other L/T/H sensor. Further assume that, upon powering on, relay gateway 2 determines and configures itself to operate in relay mode and that relay gateway 2 identifies the camera device and the other L/T/H sensor as M2M devices (e.g., M2M devices 250) associated with the zone. As shown in FIG. 6, assume that relay gateway 2 establishes a Wi-Fi connection with the camera device and establishes a Zigbee connection with the other L/T/H sensor. Relay gateway 2 may obtain third M2M information from the camera device and the other L/T/H sensor and transmit the third M2M information to the aggregator gateway for transmission to the server.

Therefore, as additional M2M devices are deployed in a zone, additional relay and/or aggregator gateways may be deployed accordingly. Thus, scalability may be provided to an M2M architecture of a zone.

As indicated above, FIG. 6 is provided merely as an example. Other examples are possible and may differ from what was described with regard to FIG. 6.

Figure 7:
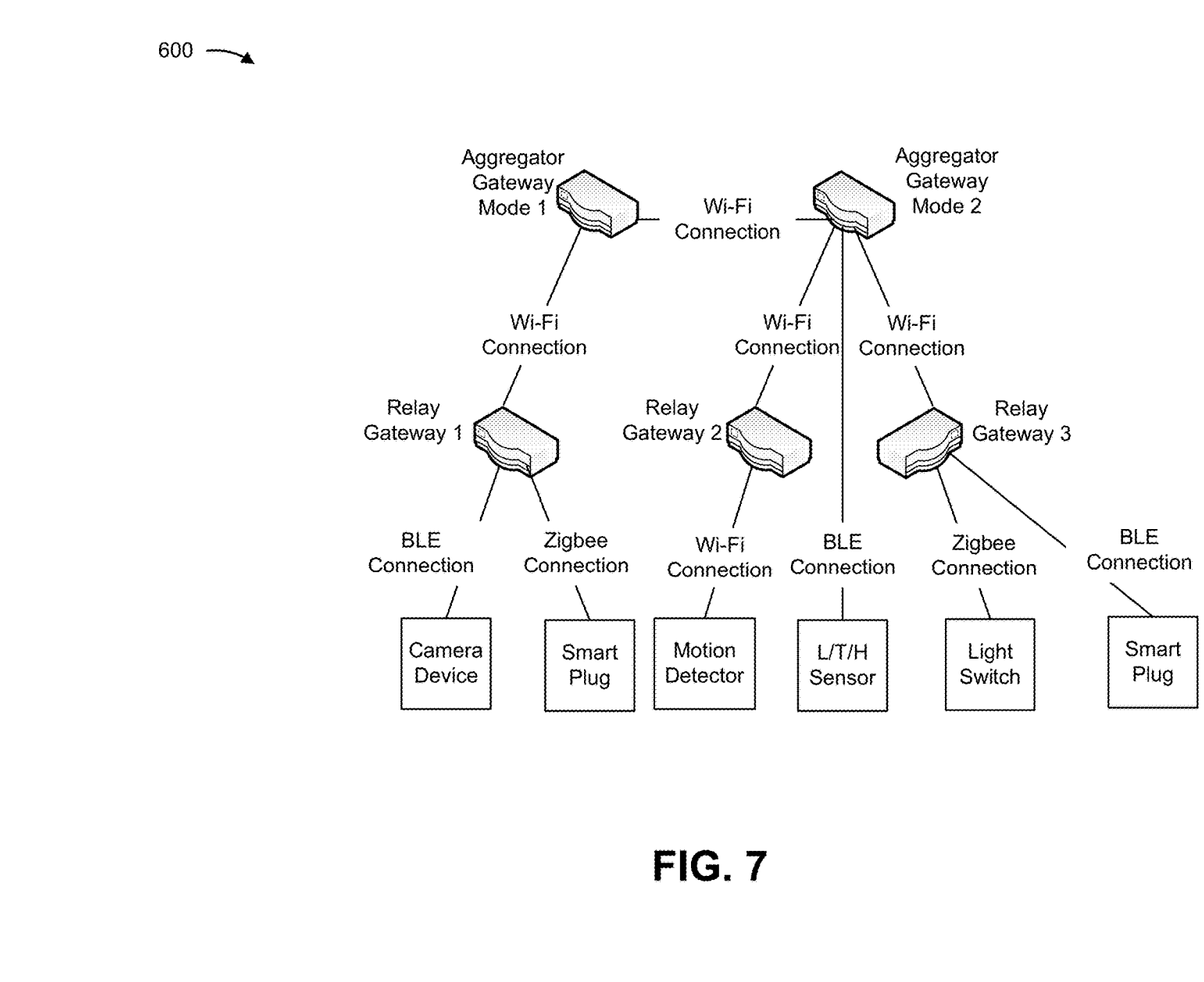
FIG. 7 is a diagram of an example implementation relating to the example process shown in FIG. 5.

FIG. 7 is a diagram of an example implementation 700 relating to example process 500 shown in FIG. 5. For the purposes of example implementation 700, assume that aggregator gateway 1 has transmitted, to aggregator gateway 2, information regarding devices associated with aggregator gateway 1. As shown in FIG. 7, the devices associated with aggregator gateway 1 may include relay gateway 1 (connected to aggregator gateway 1), a camera device (connected to relay gateway 1), and a smart plug (connected to relay gateway 1). The information regarding the devices associated with aggregator gateway 1 may include M2M information obtained by the camera device and the smart plug. Further assume that aggregator gateway 2 has transmitted, to aggregator gateway 1, information regarding devices associated with aggregator gateway 2. As shown in FIG. 7, the devices associated with aggregator gateway 2 may include relay gateway 2 (connected to aggregator gateway 2), a motion detector (connected to relay gateway 2), an L/T/H sensor (connected to aggregator gateway 2), relay gateway 3 (connected to aggregator gateway 2), a light switch (connected to relay gateway 3), and a smart plug (connected to relay gateway 3).

Further assume that aggregator gateway 2 has detected that aggregator gateway 1 is experiencing a failure. Accordingly, aggregator gateway 2 may transmit the information regarding the devices associated with aggregator gateway 1 to a server. For the purposes of example implementation 700, further assume that aggregator gateway 1 become operational and that aggregator gateway 1 has detected that aggregator gateway 2 is now experiencing a failure. Accordingly, aggregator gateway 1 may transmit the information regarding the devices associated with aggregator gateway 2 to the server.

As indicated above, FIG. 7 is provided merely as an example. Other examples are possible and may differ from what was described with regard to FIG. 7.

Thus, systems and/or methods described herein may provide scalability to an M2M architecture to address any potential increase in a quantity of M2M devices (e.g., in a zone). For example, as additional M2M devices are deployed in a zone over time, additional relay gateways (and/or aggregator gateways) may be deployed accordingly. Additionally, implementations described herein may provide redundancy to the M2M architecture to remedy issues relating to transmission of M2M information obtained by a gateway experiencing a failure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising:
   a first machine-to-machine (M2M) gateway, associated with a zone, to:
      determine whether the first M2M gateway is to operate in an aggregator mode or in a relay mode based on whether the zone has an associated aggregator gateway;
      when the first M2M gateway is to operate in the aggregator mode based on the zone having no associated aggregator gateway:
         identify a plurality of first devices,
            the plurality of first devices including one or more second M2M gateways operating in the relay mode,
         obtain first information from the plurality of first devices,
            at least some of the first information being obtained by the one or more second M2M gateways operating in the relay mode from one or more second devices connected to the one or more second M2M gateways operating in the relay mode, and
         transmit the first information to a server; and
      when the first M2M gateway is to operate in the relay mode based on the zone having the associated aggregator gateway:
         identify one or more third devices,
         obtain second information from the one or more third devices, and
         transmit the second information to the associated aggregator gateway for transmission to the server.

2. The system of claim 1, where the one or more second devices and the one or more third devices include M2M devices.

3. The system of claim 1, where the first M2M gateway, when operating in the aggregator mode, is further to:
   identify an additional M2M gateway operating in the aggregator mode, and
   obtain, from the additional M2M gateway, information regarding one or more other devices connected to the additional M2M gateway.

4. The system of claim 3, where the one or more other devices include one or more other M2M gateways operating in the relay mode,
   where the information regarding the one or more other devices includes third information obtained by the one or more other M2M gateways, and
   where the first M2M gateway is further to:
      determine whether the additional M2M gateway is experiencing a failure, and
      transmit the third information to the server when the additional M2M gateway is experiencing the failure.

5. The system of claim 1, where the first M2M gateway is further to:
   determine that the zone is associated with the plurality of first devices, and
   where, when identifying the plurality of first devices, the first M2M gateway is to:

identify the plurality of first devices based on determining that the zone is associated with the plurality of first devices.

6. The system of claim 1, where the first M2M gateway, when operating in the aggregator mode, is further to:
obtain information regarding the plurality of first devices, and
store the information regarding the plurality of first devices.

7. The system of claim 1, where the first information includes information identifying the plurality of first devices.

8. The system of claim 7, where the first information regarding the plurality of first devices includes:
information identifying associations between the one or more second M2M gateways operating in the relay mode and the one or more second devices, and
information identifying a location of the one or more second devices.

9. A system comprising:
a first gateway, associated with a zone, to:
determine whether the first gateway is to operate in an aggregator mode or in a relay mode based on whether the zone has an associated aggregator gateway;
when the first gateway is to operate in the aggregator mode based on no aggregator gateway being associated with the zone:
identify one or more second gateways associated with the zone,
the one or more second gateways operating in the relay mode, obtain first information from the one or more second gateways,
the first information being obtained by the one or more second gateways from one or more first M2M devices, and
transmit the first information to a server; and
when the first gateway is to operate in the relay mode based on an aggregator gateway being associated with the zone:
identify one or more second M2M devices associated with the zone,
obtain second information from the one or more second M2M devices, and
transmit the second information toward the server.

10. The system of claim 9, where the first gateway, when operating in the aggregator mode, is further to:
establish a connection with the one or more second gateways, and
where, when obtaining the first information, the first gateway is to:
obtain the first information from the one or more second gateways via the connection.

11. The system of claim 9, where the first gateway, when operating in the aggregator mode, is further to:
identify a third gateway, associated with the zone, operating in the aggregator mode,
obtain, from the third gateway, information regarding one or more additional gateways connected to the third gateway,
the one or more additional gateways operating in the relay mode,
the information regarding the one or more additional gateways including:
information identifying the one or more additional gateways, and
third information obtained by the one or more additional gateways from M2M devices connected to the one or more additional gateways.

12. The system of claim 11, where the first gateway is further to:
determine whether the third gateway is experiencing a failure, and
transmit the third information to the server when the third gateway is experiencing the failure.

13. The system of claim 11, where the first gateway is further to:
determine that the third gateway is experiencing a failure,
determine whether a difference between a current date and/or time and a timestamp associated with the third information exceeds a threshold after determining that the third gateway is experiencing the failure, and
obtain, based on the information identifying the one or more additional gateways, fourth information from the one or more additional gateways when the difference exceeds the threshold.

14. The system of claim 13, where the first gateway is further to:
transmit the fourth information to the server when the third gateway is experiencing the failure.

15. The system of claim 9, where the first gateway is further to:
determine that the one or more second gateways are associated with the zone, and
where, when identifying the one or more second gateways, the first gateway is to:
identify the one or more second gateways based on determining that the one or more second gateways are associated with the zone.

16. The system of claim 9, where the first gateway, when operating in the aggregator mode, is further to:
obtain information regarding the one or more second gateways, and
store the information regarding the one or more second gateways.

17. The system of claim 9, where the first information regarding the one or more second gateways includes at least one of:
information identifying the one or more second gateways, or
information identifying a location of the one or more second gateways.

18. A system comprising:
an aggregator gateway associated with a zone;
a first gateway connected to the aggregator gateway,
the first gateway being associated with the zone,
the first gateway being connected to:
a first M2M device located in the zone, and
a second M2M device located in the zone, and
the first gateway being determined to be a relay gateway based on a determination that the aggregator gateway is associated with the zone; and
a second gateway connected to the aggregator gateway,
the second gateway being associated with the zone,
the second gateway being connected to:
a third M2M device located in the zone, and
a fourth M2M device located in the zone, and
the second gateway being determined to be a relay gateway based on the determination that the aggregator gateway is associated with the zone.

19. The system of claim 18, further comprising:
another aggregator gateway connected to the aggregator gateway; and a third gateway connected to the other aggregator gateway,
the third gateway being connected to at least one of a fifth M2M device or a sixth M2M device, and
the third gateway being a relay gateway.

20. The system of claim 18, where the aggregator gateway is connected to a fifth M2M device.

\* \* \* \* \*